Feb. 9, 1932. O. MANTIUS 1,844,513
PROCESS OF RECLAIMING SLUDGE ACID IN PETROLEUM REFINING
Filed July 7, 1930
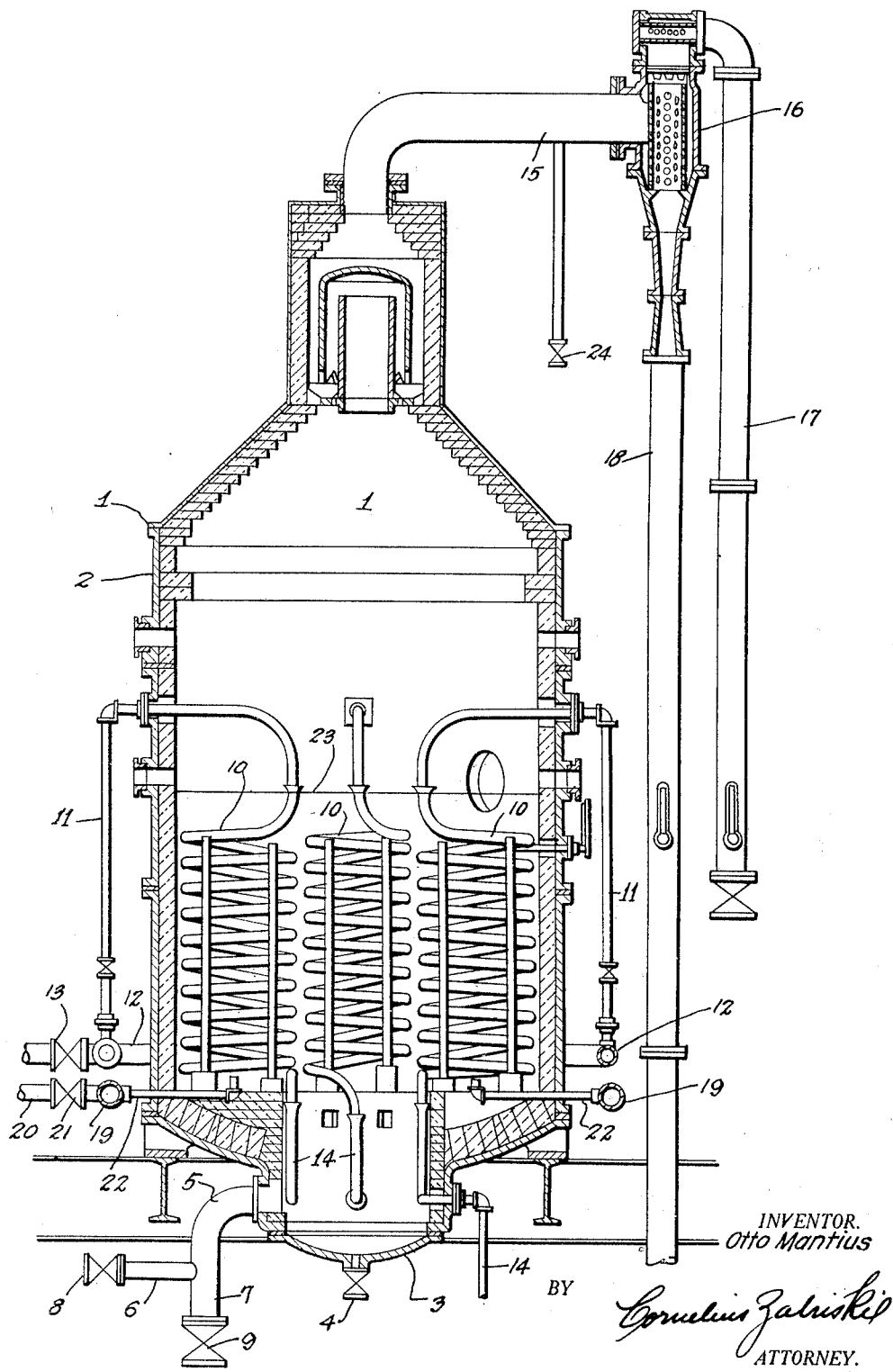
INVENTOR.
Otto Mantius
BY
Cornelius Zabriskie
ATTORNEY.

Patented Feb. 9, 1932

1,844,513

UNITED STATES PATENT OFFICE

OTTO MANTIUS, OF NEW YORK, N. Y.

PROCESS OF RECLAIMING SLUDGE ACID IN PETROLEUM REFINING

Application filed July 7, 1930. Serial No. 465,884.

This invention is a process for reclaiming sludge acid in petroleum refining and is more particularly directed to improvements in the process described and claimed in Patent No. 1,384,978, issued July 19, 1921 to Walter E. Simonson and Otto Mantius.

In the refining of petroleum, the oil, after being treated by sulphuric acid in an agitator, is separated is so far as practically feasible by stratification, leaving a residue generally known as sludge. This sludge is treated with hot water or steam and permitted to stratify. The oil is then drawn off leaving what is known to the art as "sludge acid". This sludge acid is contaminated with tar, oil and water, and other impurities.

The process of said patent relates to the treatment of this sludge acid for the purpose of recovering the acid for re-use in the refinement of petroleum. According to that process, the sludge acid is placed in a vacuum concentrator wherein it is concentrated by heat from internal steam coils. After concentration, the acid and the carbonaceous matter which it contains, are separated by decantation to remove the latter, leaving reclaimed concentrated acid which may be mixed with fuming sulphuric acid for re-use.

Experience with certain oils, however, has shown that during concentration treatment, as stated, there is a point in the operation wherein the degree of concentration of the acid together with the heat from the coils brings about decomposition of certain residual organic compounds, such, for example, as naphthenic and sulphonic acids, causing a violent gas evolution and consequent foaming which makes it impossible to uninterruptedly continue to concentrate such acids in the vacuum concentrator.

It has thus been heretofore found necessary in such cases to carry the concentration of the acid in the evaporator only to approximately the foaming point and to thereupon remove the material from the concentrator and subject it to a collateral or independent treatment in separate open tanks or vessels. The transfer of the sludge acid from the concentrator to a separate vessel and its subsequent treatment therein, has heretofore invariably been accompanied by release into the atmosphere of fumes and vapors which not only emit obnoxious and disagreeable odors, but are of such poisonous nature as to seriously affect the health of workmen and other persons exposed thereto. This latter feature constitutes a pronounced hazard under all processes heretofore employed.

With the foregoing considerations in mind, one object of the present invention is to so improve upon the process of said patent that, by the addition of certain novel procedure, sludge acid of the character under consideration may be subjected to complete concentration treatment within the vacuum concentrator, so that when they are finally discharged from the concentrator, they may be passed directly into a suitable container in finished concentrated condition.

Another object of the invention is to provide a process of the character referred to wherein the fumes and vapors are disposed of without release thereof into the atmosphere.

Thus according to the present invention, the sludge acid in relatively weak condition enters the vacuum concentrator as in the said prior process and is thereupon concentrated until a point is reached wherein the foaming to which I have referred occurs, or is about to take place. At this point, air is admitted at suitable points, preferably near the base of the concentrator and in sufficient quantities to insure thorough agitation of the acid and to supply sufficient oxygen to foster and promote relatively rapid oxidation of the various organic compounds and impurities. This quantity of air, however, is maintained sufficiently low as to leave a slight vacuum in the concentrator, so that the decomposition operation is carried out directly within the concentrator under a partial vacuum. A jet condenser is associated with the concentrator to remove the resulting obnoxious fumes, and they are disposed of by absorption in the cooling water entering the condenser. The introduction of air as stated continues until the obnoxious compounds in the sludge acid are decomposed and foaming from this cause ceases. Thereupon the air is shut off and the concentration of the acid is proceeded with directly within the concentrator until the desired concentration, of for example, 66° Bé., is reached. Thereupon the thus concentrated material is withdrawn from the concentrator and passed to an appropriate vessel for decantation to remove residual carbonaceous material and renders the thus concentrated acid ready for re-use.

The process embodying the present invention as described effects pronounced economies in time, apparatus and heat, it speeds up production and gives a highly satisfactory product. Furthermore, the obnoxious fumes and vapors are at all times precluded from exit to the atmosphere. This constitutes an important feature of this invention.

Features of the invention, other than those specified, will be apparent from the hereinafter detailed description and claims, when read in conjunction with the accompanying drawing.

In the accompanying drawing, I have shown one form of apparatus for practising the present invention, but this apparatus is to be understood as illustrative, only, and not as defining the limits of the invention.

In the drawing, 1 designates a vacuum concentrator of any suitable kind, shown as embodying an outer shell 2 with an appropriate lining which may conveniently be of lead. The concentrator is provided at its bottom with a sump 3 having a wash out valve 4. A pipe 5 communicating with the base of the sump has two branches 6 and 7 which are respectively valved at 8 and 9. The branch 6 is the sludge acid inlet and the branch 7 is the outlet.

Positioned within the apparatus are heating coils 10 of such number and size as are required to properly treat the material. These coils are fed through pipes 11 from an exterior header 12 to which the heating medium, such as steam, is supplied through a valved inlet 13. The condensate is discharged from the coils through pipes 14. The top of the concentrator is connected by a conduit 15 to a jet condenser 16 to which water is supplied through a pipe 17, while a pipe 18 leads from the condenser to, e. g., an overflow waste vat.

Particular attention is called to the fact that the lower portion of the concentrator is embraced by a header 19 fed from an air line 20 valved at 21. From this header 19 a number of pipes 22 lead through the wall of the concentrator into the interior thereof and terminate in suitable outlets. In the apparatus shown, a pipe 22 leads to the interior and directly below each coil, so that when air is introduced, it is directed upwardly through the corresponding coil. This is the preferred form of apparatus although I wish it understood that I may use any number of outlets with any suitable location without departing from this invention.

In carrying out the process of this invention, the sludge acid to be concentrated is fed into the concentrator through the pipe 6 to about the level indicated by the line 23, so as to submerge the coils 10. All of the valves 8, 9 and 13 being closed, the valve 13 is opened to admit steam to the coils 10. Steam of suitable pressure is now introduced for the purpose of heating the sludge acid and concentrating the same to a point where the density reaches about 56° or 60° Bé. During this time, the jet condenser functions to produce a sufficiently high vacuum to reduce the boiling point of the sludge acid to limits wherein boiling will occur at approximately 240 degrees to 260 degrees F. The fumes and vapors evolved during the concentration operation as stated pass outwardly through the pipe 15 into condenser 16 and are disposed of through the pipe 18.

By the time that the acid is concentrated to about 56° or 60° Bé., decomposition of certain organic compounds, such as the sulphonates, is found will commence and produce a violent gas evolution with resulting foaming. When this stage of the process is reached, the valve 21 is opened to admit air into the header 19 and this air passes through the several pipes 22 into the interior of the concentrator and near the base thereof. As it is discharged from the nozzles, it passes upwardly through the body of sludge acid contained in the concentrator producing a marked agitation of the acid to thereby bring the air into commingled relation with the acid. As a result, organic compounds and impurities are oxidized and pass off as gases through the pipe 15, condenser 16 and pipe 18 to be disposed of by absorption by the water entering the condenser. During the passage of air through the charge in the concentrator, as stated, a partial vacuum is maintained in the concentrator by properly regulating the supply of air, so that it will not be fed in such quantities as to destroy the partial vacuum. In other words, the feed of air is such that a slight vacuum is maintained inside of the concentrator so that the fumes and air are absorbed in the water jet condenser and do not escape into the air.

The feed of air is continued through a sufficient period to decompose all the obnoxious compounds in the acid that can be thus disposed of. From two to four hours is generally sufficient to accomplish this result and during this period the coils are supplied with steam at suitable pressure in order to keep the acid just below the boiling point.

After the said obnoxious compounds have been decomposed as stated, the valve 21 is closed, the vacuum within the concentrator is again raised to lower the boiling point as stated and thereupon steam is fed to the coils at a pressure of say 50 to 100 pounds, so as to promote a rapid resumption of concentration of the acid until such acid reaches a density of approximately 65°-66° Bé.

After the acid has been concentrated to the desired density, the valve 13 is closed, the concentrator is vented as by a vent valve 24 and the valve 9 opened to permit the acid to be withdrawn and fed by gravity or through an appropriate pump to a suitable settling tank where the carbonaceous matter still retained in the acid may be removed.

It will thus be apparent that according to the present invention, the sludge acid after being fed to the concentrator remains therein from the commencement of concentration until the completion thereof. No transfer of the acid is required, and it does not have to be removed and treated by extraneous or collateral processes after a partial concentration as heretofore. The complete concentration of the acid is accomplished from start to finish within the concentrator. This means not only a very pronounced saving in initial installation of apparatus, but also effects pronounced savings in the cost of operation due to economies in handling and the absence of heat losses. In practice, the process of this invention has proven highly economical and thoroughly efficient.

It is characteristic of this invention that the process may be commercially carried out without polution of the atmosphere by resulting obnoxious gases, vapors and odors. These foul smelling and poisonous products of the operation are precluded from escaping into the atmosphere and are efficiently disposed of by absorption. The process is thus devoid of those objections which are unavoidable under prior practice. Furthermore, the workmen are not subjected to the health hazards to which I have hereinbefore referred as attendant upon all prior processes of this general character.

The apparatus which I have shown has given thoroughly satisfactory results when operated as stated. I wish it understood, however, that the invention is not limited to this particular apparatus, but that the process of this invention is fully commensurate with the appended claims.

I wish to point out that the entire concentration and decomposition operations are not only carried on within the concentrator as described, but that these operations occur in the sequence stated under partial vacuum. In other words, the process is in its nature continuous, the heating of the acid continues from the start of the concentration, during preliminary concentration, then through the decomposition period, and on through the final concentration period without cessation. The partial vacuum is similarly maintained although it is lower during the decomposition period than during the concentration periods for obvious reasons. Thus the heating and partial vacuum may be said to be concurrent and continuous. Superior results in the reclamation of sludge acid are accomplished by this process. The heat is maintained sufficiently low to preclude burning of organic matter contained in the acid and thus discoloration does not occur.

Having thus fully described the invention, what I claim as new and desire to secure by Letters Patent is:

1. The process of reclaiming sludge acid in petroleum refining, which consists in partially concentrating the sludge acid in a suitable concentrator under a partial vacuum, then passing air through the acid in the concentrator in sufficient quantities to oxidize undesirable organic compounds while maintaining a partial vacuum in the concentrator, and thereafter resuming the concentration of said acid under a partial vacuum in the concentrator until it reaches a desired density.

2. The process of reclaiming sludge acid in petroleum refining, which consists in partially concentrating the sludge acid in a suitable concentrator, then passing air through the acid in the concentrator in sufficient quantities to oxidize undesirable organic compounds and thereafter resuming the concentration of said acid in the concentrator until it reaches a desired density, and maintaining an uninterrupted partial vacuum within the concentrator throughout the period of treatment.

3. The process of reclaiming sludge acid in petroleum refining, which consists in partially concentrating the sludge acid in a suitable concentrator while excluding air, then passing air through the acid in the concentrator in sufficient quantities to oxidize undesirable organic compounds, and thereafter resuming the concentration of said acid in the concentrator while excluding air and until the acid reaches the desired density.

4. The process of reclaiming sludge acid which consists in placing it in a suitable container, then partially concentrating the sludge acid by boiling it, then decomposing impurities in the sludge acid by passing air therethrough, while maintaining the sludge acid at approximately its boiling point, and thereafter resuming the concentration of the acid by further boiling, and maintaining the sludge acid under an uninterrupted partial vacuum in the same container throughout such process.

5. The process of reclaiming sludge acid which consists in establishing a pool of sludge acid, then boiling the same under partial vacuum to partially concentrate the acid, then oxidizing the impurities in such pool, under partial vacuum, thereafter resuming the concentration of the acid in said pool under partial vacuum until the acid reaches the desired density, and finally withdrawing the product to dissipate said pool.

6. The process of reclaiming sludge acid which consists in establishing a pool of sludge acid within a closed container, then boiling the acid under partial vacuum within the container, to partially concentrate the acid, then oxidizing the impurities in said pool within the container under a partial vacuum, thereafter resuming the concentration of the acid in the pool under partial vacuum until the acid reaches the desired density, precluding the escape of obnoxious gases and vapors from the vessel during the periods of partial concentration, oxidation and final concentration, and finally withdrawing the product from the container to dissipate the pool.

In testimony whereof I have signed the foregoing specification.

OTTO MANTIUS.